R. M. WARWICK & E. V. NESSLING.
FEED DEVICE FOR MACHINES FOR TYING OBJECTS WITH WIRE.
APPLICATION FILED APR. 19, 1915.

1,268,305.

Patented June 4, 1918.
6 SHEETS—SHEET 1.

Inventor:
Rogers M. Warwick,
Edwin V. Nessling.
By Rudolph ~~~
Atty.

R. M. WARWICK & E. V. NESSLING.
FEED DEVICE FOR MACHINES FOR TYING OBJECTS WITH WIRE.
APPLICATION FILED APR. 19, 1915.

1,268,305.

Patented June 4, 1918.
6 SHEETS—SHEET 5.

UNITED STATES PATENT OFFICE.

ROGERS M. WARWICK AND EDWIN V. NESSLING, OF CHICAGO, ILLINOIS, ASSIGNORS TO GENERAL WIRE TIE COMPANY, OF CHICAGO, ILLINOIS, A CORPORATION OF ILLINOIS.

FEED DEVICE FOR MACHINES FOR TYING OBJECTS WITH WIRE.

1,268,305.          Specification of Letters Patent.          Patented June 4, 1918.

Application filed April 19, 1915. Serial No. 22,374.

*To all whom it may concern:*

Be it known that we, ROGERS M. WARWICK, of Chicago, Cook county, Illinois, and EDWIN V. NESSLING, of Chicago, Cook county, Illinois, both citizens of the United States, have invented certain new and useful Improvements in Feed Devices for Machines for Tying Objects with Wire; and we do hereby declare the following to be a full, clear, and exact description of the invention, such as will enable others skilled in the art to which it appertains to make and use the same.

This invention relates to improvements in object carrying attachments for machines for tying objects with wire such as are described and claimed in the pending application of Rogers M. Warwick, Ser. No. 844,894, filed June 13, 1914, and Ser. No. 9962, filed Feb. 23, 1915; said machines being particularly adapted for tying the mouths of bags with wire and for tying similar articles or bundles of articles.

The present invention is intended for conjoint use with machines of the general character described and claimed in the copending applications of the said Warwick and such as is also described and claimed in the pending application of Edwin V. Nessling filed April 19, 1915, Ser. No. 22395.

The particular objects of the present invention are:

First: To provide a carrier adapted to receive the objects to be tied at one point and deliver the same into proper position relative to the tying mechanism of the tying machine to be tied, and thereafter carry the same to another point at which the bag or other object is released.

Second: To provide an object-carrying mechanism which includes means for feeding the objects to said carrier and automatically causing the same to be engaged by the latter preparatory to their carriage successively into the aforesaid position relative to the tying mechanism.

A further object of the invention is to provide object-engaging mechanism on the carrier exerting a yielding hold on the same whereby to permit such objects to yield to strains imposed upon the same and the tying mechanism during the tying operation. Included in this object is that of maintaining the wire about the object at a given tension during the completion or closure of the tie by the tying mechanism without increasing the tension of such wire about the object. This object will be more fully understood from the following specification:

A further object of the invention is to provide mechanism on the tying machine for maintaining the latter normally inoperative to pass wire about or tie an object, and which is controlled by the object disposed in the carrier to automatically throw said tying mechanism into operative relation to the object whenever the latter is presented to the tying mechanism whereby a waste of wire is obviated.

In the accompanying drawings ilustrating a suitable embodiment of the invention.

Figure 1:
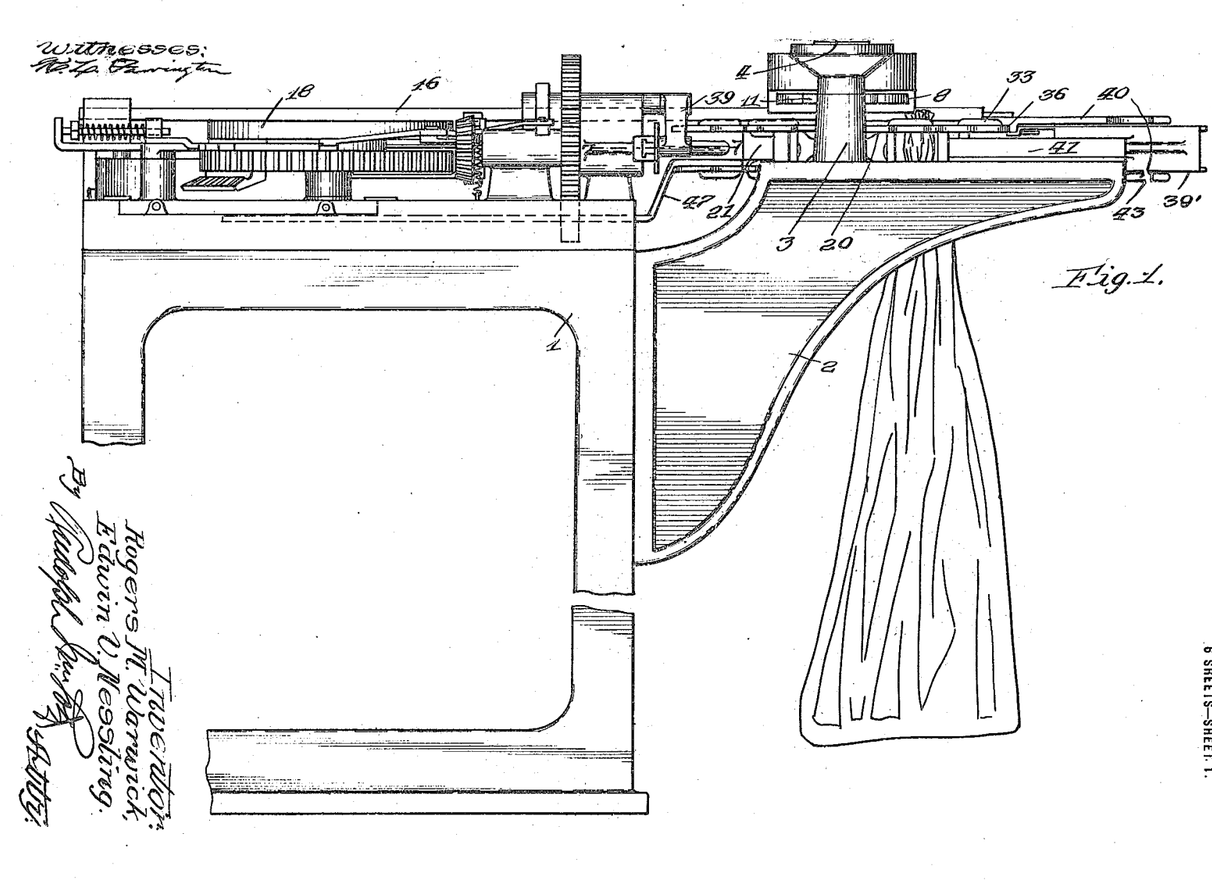
Figure 1 is a view in side elevation of a machine for tying objects with wire equipped with an object carrier constructed in accordance with the invention.
Figure 2:
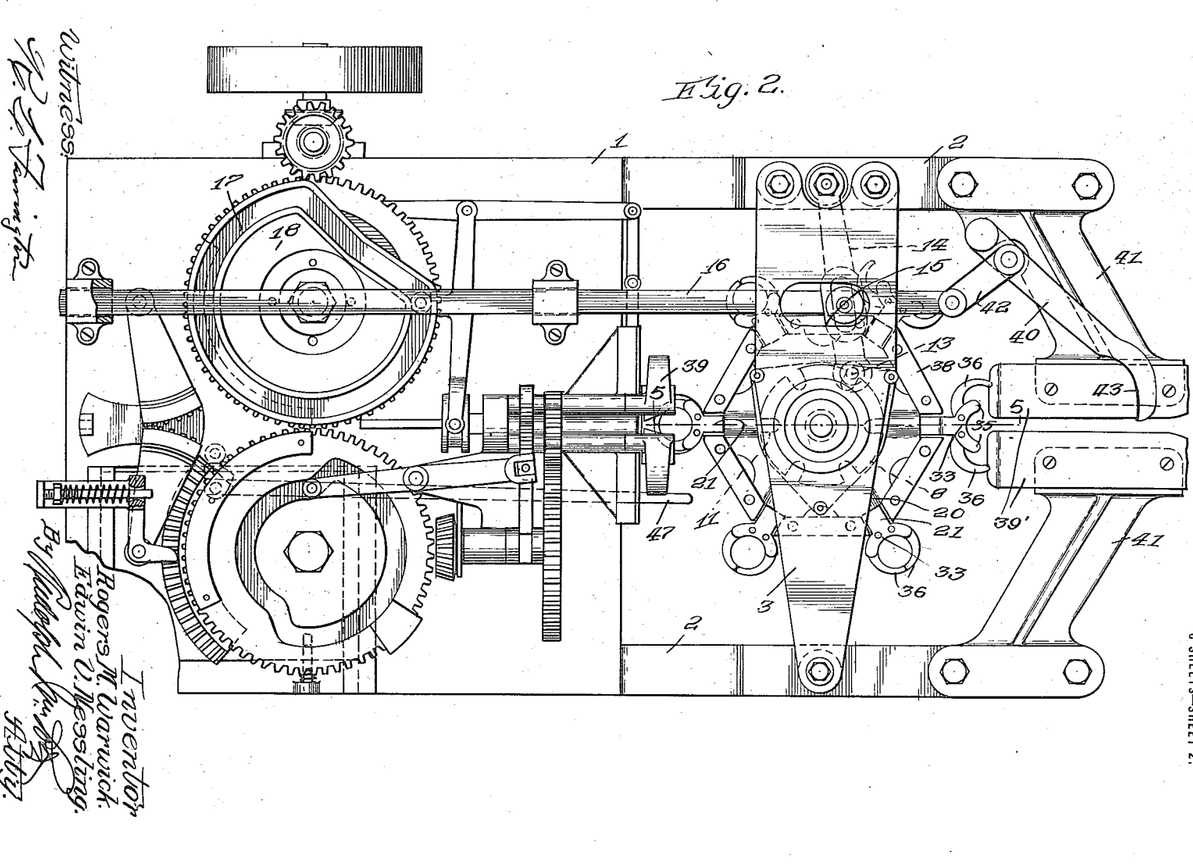
Fig. 2 is a fragmentary top plan view of the tie machine and a complete plan view of the object carrier associated therewith.
Figure 3:
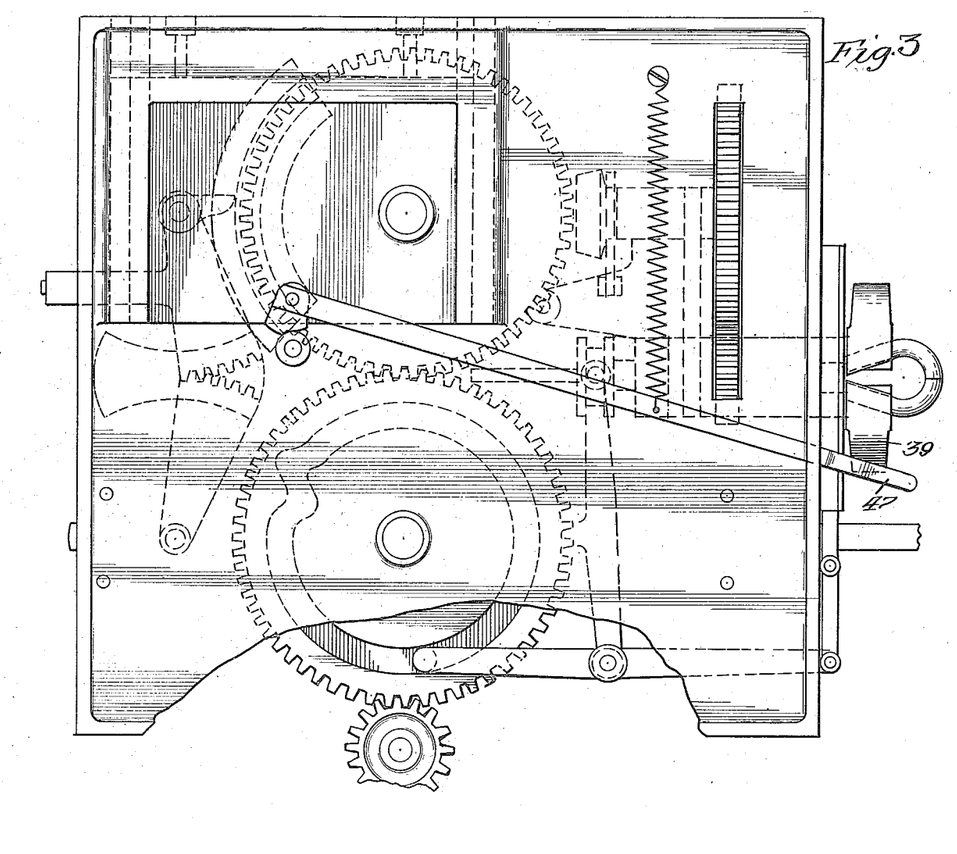
Fig. 3 is a bottom plan view of the tying machine showing the means controlling the latter to maintain the same normally inoperative to form or close a tie about an object.

The tying mechanism is fully described in the aforesaid pending application of said Warwick Ser. No. 9962 and includes loop forming wire guides as shown in Figs. 1 and 3, which are separable so that after a loop of wire has been formed, the wire is released from the guides and remains looped about the object. The wire guides are, during separation, also moved out of the plane of the loop and the path of the object and the object carrier, thereby permitting the object to be tied to be brought into position to be surrounded by the wire guides and the loop when the former are closed and the latter is formed.

The loop is, in the instance illustrated, formed in a horizontal plane and the object carrying mechanism is, therefore, adapted to move the object in a similar plane, the axis of the same being vertically disposed, and being arranged so that the plane of the loop is disposed in the path of that portion of the object which is to be tied.

Mounted on the frame 1 of the tying machine are brackets 2 upon which the object-carrier is supported. The said brackets are disposed parallel with each other and are spanned by a cross-piece 3 supported upon the same. The carrier comprises a turn-table which includes the spindle 4 provided at its upper end with an annular flange 5 which rests upon the top plate 6 of a ball-bearing suitably disposed in a central recess or pocket 7 in the said cross-piece 3, and disposed midway between the ends of the latter. The said spindle 4 also passes through the central opening in a member 8 between which and a member 9 a ball-bearing 10, similar to the ball-bearing aforesaid, is mounted. The said member 8 is keyed to the spindle 4 and is provided in its periphery with a plurality of radial recesses 11 in which the projection 13 at the end of a rocking arm or lever 14 is adapted to engage for rotating said spindle through a predetermined arc at predetermined intervals. The said arm or lever 14 is pivotally mounted upon one of said brackets 2 and is provided between its ends with a longitudinal slot 15 in which a projection on a reciprocable rod or plunger 16 engages, the latter carrying an anti-friction roller between its ends engaging in the groove 17 of the cam 18 carried on the body of the tying machine for effecting intermittent movement of said spindle 4 at proper intervals relative to the operation of the tying mechanism of the tying machine to cause objects carried by the carrier to be tied. By means of said plunger 16 said arm or lever 14 is rocked to engage successively in the several recesses 11 to move the said turntable through the aforesaid predetermined arc.

Mounted upon the lower end portion of the spindle 4 which is of smaller diameter than the upper portion thereof is the turn-table 19 equipped with a plurality of radially disposed guides 20 in each of which a plunger 21 is disposed. Each of said plungers is equipped with a projection 22 projecting through a slot 23 in the upper wall of the guide 20 and coacting with the latter to limit the radial movements of said plunger 21 in said guide, and preventing rotation of same therein. Each guide 21 is further equipped with a transversely disposed branch 24 in which a plunger 25 is reciprocably movable; said plunger 25 being provided with a tapered head 26 adapted to engage in the recesses 27 and 28 respectively in the lower portion of said plunger 21. Said recesses 27 and 28 are V-shaped and are separated from each other by the V-shaped ridge 29 over which said head 26 of said plunger must spring in passing from one of said recesses into the other thereof. The said branch 24 is closed by means of a plug 30 having a central opening into which the shank of the said plunger 25 projects and between which and the head 26 of said plunger the helical compression spring 31 is disposed which holds the head of the plunger always firmly engaged in the said recesses 27 or 28.

Each of said plungers 21 is equipped with a shank 32 at its outer end and the latter carries a forked head 33 which is rigid therewith. The respective arms 34 of said forked head 33 are in turn forked to provide pairs of projections 35 upon which the object-clamping arms 36 are pivotally mounted. The latter are disposed in pairs, each pair being mounted on one of said arms 34 at the inner ends of the arms or projections 35 thereof, and each of said arms 36 is approximately semi-circular so that when in closed position there is formed between them a substantially circular opening in which the object is held. The shape of this opening may, of course, be varied to suit different objects to be carried. The said arms 35 also border the opening formed between the arms 36 when the latter are closed.

Figure 4:
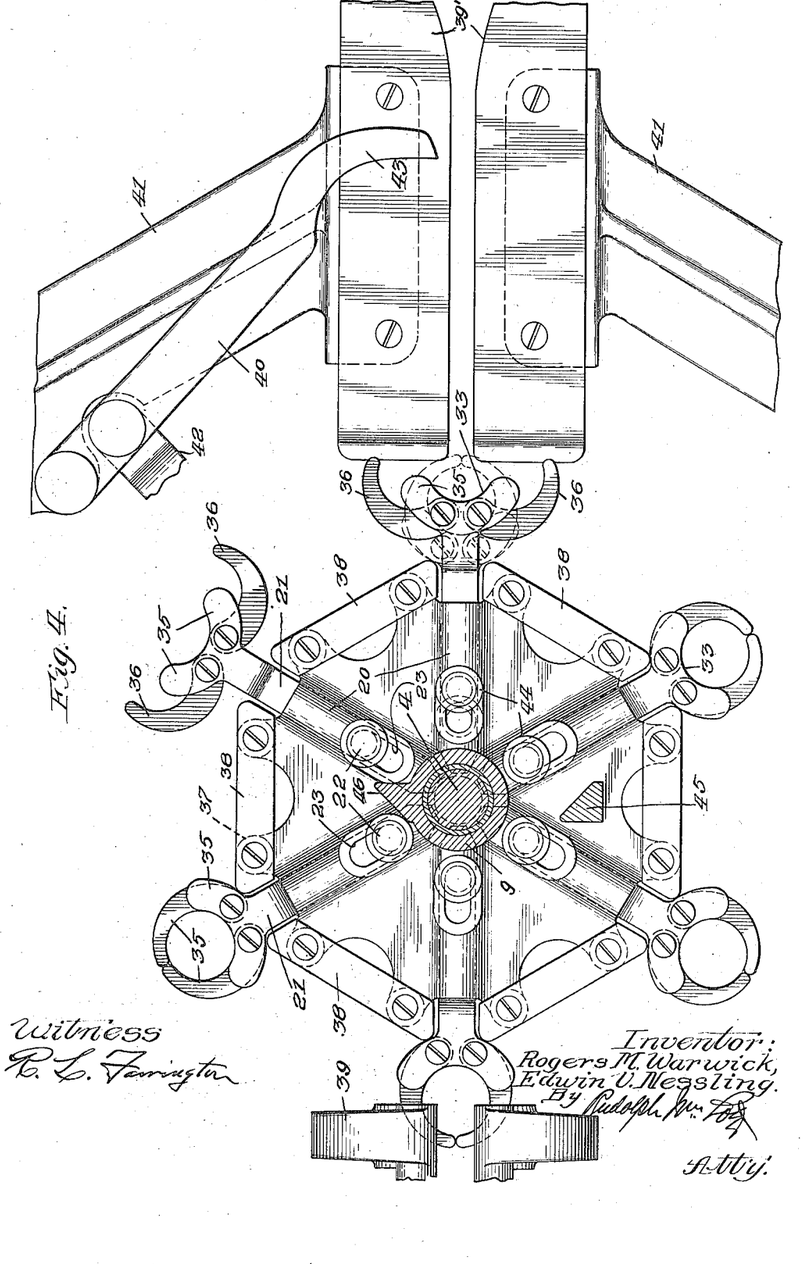
Fig. 4 is a detail top plan view of the top plate of the object carrier, and the part immediately below the same shown in horizontal section.
Figures 5, 6:
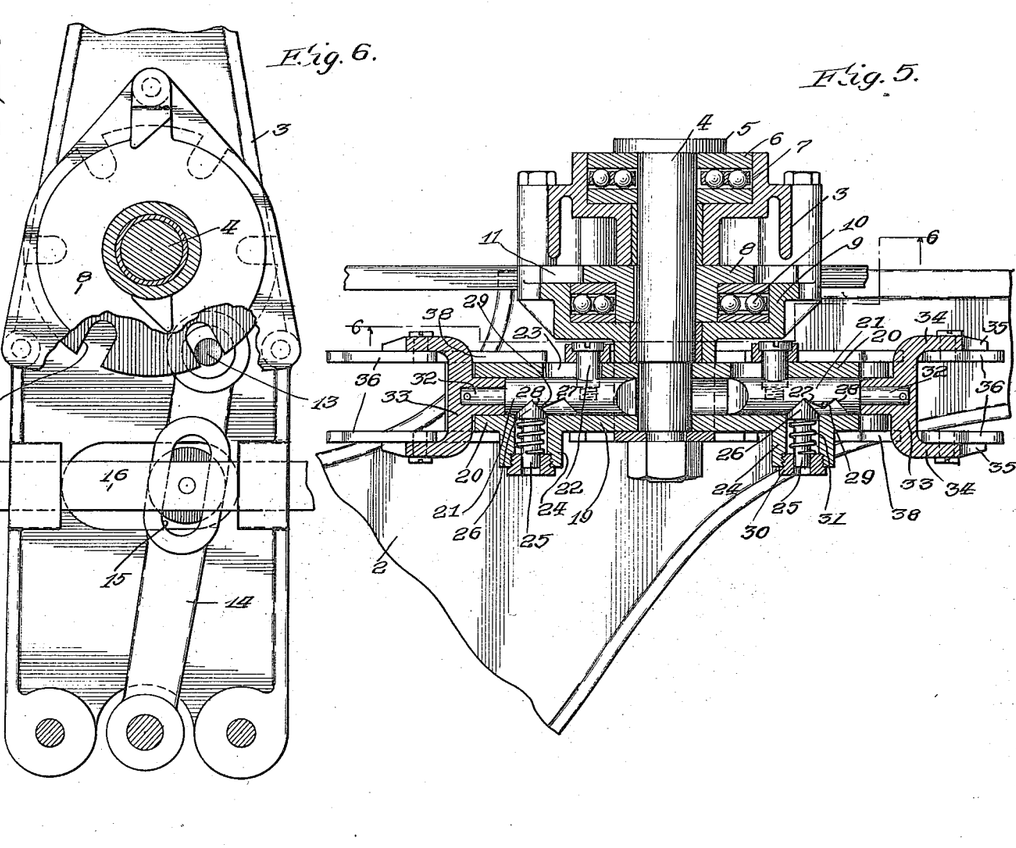
Fig. 5 is a central vertical longitudinal section through the carrier mechanism taken on the line 5—5 of Fig. 2.
Fig. 6 is a detail horizontal section on the line 6—6 of Fig. 5 showing the means for imparting intermittent motion to the carrier at intervals.

The top and bottom plates of the turn-table between which the said guides 20 are formed are provided with pairs of peripheral projections 37 disposed between the contiguous guides 20. Mounted upon each pair of said projections 37 are two plates 38, the ends of which are disposed in the path of the said arms 36 so that as the plungers 21 are moved inwardly the inner end portions of the arms 36 engage the ends of the plates 38 and are thereby turned to the closed position particularly illustrated in Fig. 4. Referring particularly to Figs. 4 and 5, it will be seen that the plunger 21, which is disposed diametrically opposite the one shown in said Fig. 4 as disposed contiguous to the wire guide supports 39, is open to receive an object. The head 26 of the plunger 25 is, as shown in Fig. 5, engaged in the recess 27. The pressure of said plunger 25 serves to hold the plunger 21 in the position indicated in said Fig. 5 and Fig. 4. By crowding the object against the arms 34 of the plunger head 33 the said plunger will be moved inwardly thereby causing the head 26 of the plunger 25 to ride over the V-shaped projection 29 separating the recesses 27 and 28, and will at the same time cause the arms 36 to engage the ends of the plates 38 thereby closing the said arms about the object as indicated in dotted lines in Fig. 4. The inclined inner face of the head 26 of the plunger being engaged with the similarly inclined face of the recess 28 will cause the plunger 21 to be held yieldingly at or contiguous to the inner limit of its movement. The arms 36 are thereby caused to yieldingly engage the object, as will be obvious.

Associated with the carrier or turntable is a device for feeding the objects to the latter. In the instance illustrated the objects to be fed to the carrier consist of bags, the mouths of which are to be tied and which must be puckered preparatory thereto. The mouth portion of the bag is received between two pairs of guide plates 39' and is moved by hand toward the turntable 19. Disposed above and below the two pairs of plates 39' are rocking levers 40 each of which is pivotally mounted at one end upon the brackets 41 mounted upon the outer ends of the brackets 2. Each of said arms or levers 40 is pivotally connected between its ends with a link 42 connecting the same with the outer end of the plunger 16. The free end portion of the arm or lever 40 is curved to present a concave face 43 which spans the space between the plates 39 as said end of said arm is moved toward the turntable 19 for the purpose of crowding the mouth portion of the bag against the bifurcated head 33 of a plunger of said turntable 19. The bag mouth is thus puckered by its engagement between the said concave face 43 and the opposed concave face formed by the arms 35 of the bifurcated plunger head 33. This crowding causes the plunger to be moved toward the inner limit of its movement, and in so doing the arms 36 are forced against the ends of the plates 38 and thereby caused to close about the puckered mouth of the bag, the latter being now held and carried by successive movements to the diametrically opposite point where the wire loop is passed about the said puckered mouth of the bag between the elevation of the upper and lower pairs of arms 35 carried by each of said plunger heads 33.

Mounted upon the lower face of the crosspiece 3 and in the path of anti-friction rollers 44 carried by the projections 22 is a projection 45 having an inclined face adapted to be engaged by said anti-friction rollers 44 during the rotation of the turntable 19; said projection serving to force the plungers 21 to the rearward limit of their movement to effect closure of the arms 36 in the event that any of said plungers should fail to receive an object and thus be not thereby moved to such inner limit. Said projection also serves the purpose of effectually closing the arms 36 about the object in the event that the pressure exerted by the latter through the agency of the arm 40 should be insufficient to force the said plunger to the extreme inward limit of its movement. It will be noted that when the plunger is at the inner limit of its movement the danger of one of said arms 36 projecting too far radially outwardly from the turntable so as to strike a part of the bag-tying mechanism during travel and injuring the latter is eliminated.

On the member 9 at a point diametrically opposite the projection 45 is a similar projection 46 having an inclined face disposed in the path of the anti-friction rollers 44 when the latter are disposed at the inner limits of their movement; said projections serving to force them to the outer limit of their movement so as to release the object as clearly shown at the top of Fig. 4.

It will be further observed, and as has been previously described, that each plunger is capable of a limited outward radial movement against the action of its plunger 25 without causing the head 26 of said plunger from passing out of the recess 28. This is a very important feature of the invention inasmuch as it permits the objects to be drawn outwardly relatively to the axis of rotation of the turntable during the tying operation without being released from the carrier.

Figure 7:
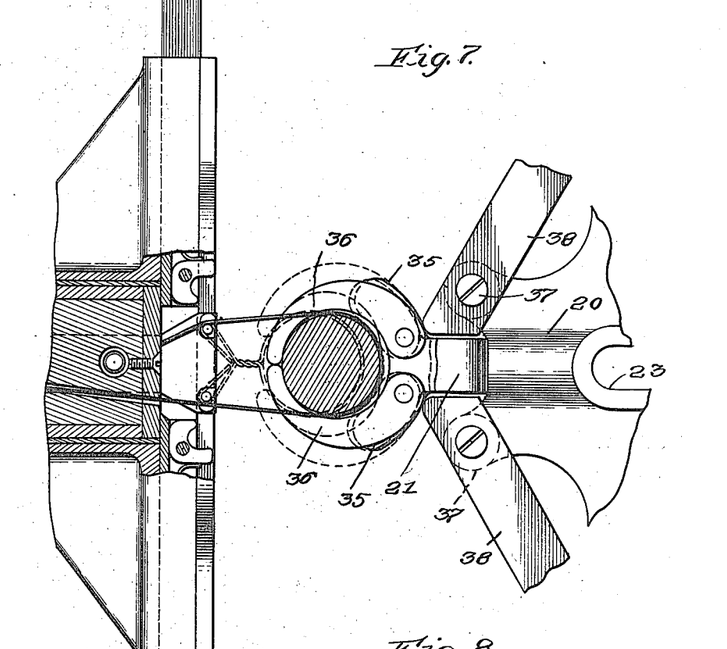
Fig. 7 is a detail horizontal section on an enlarged scale on the line 7—7 of Fig. 1 illustrating how one of the principal objects of the invention is accomplished by the machine.

In this connection attention is directed to the fact that in the bag tying machine as shown and described in said application for Letters Patent Ser. No. 9962, the wire, after being formed into a loop about the object, is drawn back to give it a tension about the same, and this tension it is desirable to maintain without any material increase or decrease thereof during the closure of the tie. By reference to Fig. 7 it will be seen that such closure is effected by twisting the end portions of a loop of wire about each other and as said end portions are firmly held in the vise jaws of the twisting head against retraction during the twisting operation, the shortening of said end portions of the loop of wire due to the twisting of the same about each other must be accomplished between two relatively yielding points. If the object were held rigidly during the twisting operation that portion of the loop embracing the object would obviously be contracted and placed under a higher tension, and, if the object were of a highly compressed or unyielding nature, a breakage of the wire would result. By yieldingly holding the object so as to permit the same to move toward the twisting head during the twisting operation, the shortening of the end portions of the loop is permitted without increasing the tension of the wire about the object, so that the twisting takes place outwardly from the point at which the end portions of the wire overlap each other to form the endless circular collar about the object. This insures an equal tension of the wire about all objects and eliminates undue strain on the latter and on the wire.

In the aforesaid application of Edwin V. Nessling, Ser. No. 22,395 there is also shown and described mechanism for normally maintaining the wire engaging feed mechanism of the tying machine out of engaging relation to the wire so as to prevent the feeding forward of the same to form a loop unless an object to be carried is presented to said mechanism. This mechanism includes the spring-held lever 47 held in the path of objects engaged in the plunger heads 33 and is turned by said objects successively into position to permit the wire feeding mechanism to engage the wire and feed the same forward to form the loop about the object as the latter is presented. This lever is disposed out of the path of any part or parts of the turntable, so that in the event that one of the plunger heads 33 is not carrying the object the tying mechanism would not operate, thus eliminating the waste of wire which might otherwise result. As each object passes the lever 47 the latter is moved by its spring back to its normal position in the path of the next succeeding object.

Figure 8:
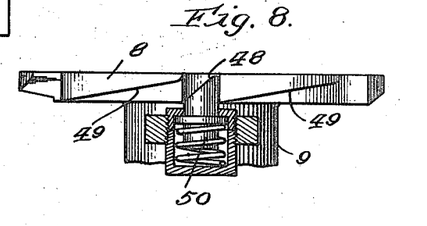
Fig. 8 is a detail sectional view of the mechanism for imparting movement to the carrier.

The member 8 is cut away between the successive radial recesses therein to afford a succession of inclined ratchet faces over which the projection on the rocking lever for imparting intermittent movement to said member is adapted to slide. The said projection 48 is the lower end of a spring-held plunger suitably mounted in said rocking lever as shown in Fig. 8 and is equipped with an inclined lower face which is adapted to slide over the inclined surfaces 49 of the member 8. The latter is held against reverse rotation by the contact of said inclined faces by the engagement of the object with the wire guides. Preferably, however, a spring-held stop 50 is provided which engages successively in the recesses of said member 8 and is forced out of same by the forcible rotation of said member.

The said feed device may obviously be changed and varied in details of construction without departing from the invention as defined in the appended claims.

We claim as our invention:

1. In a machine of the kind specified, the combination with means for passing one end portion of a long strand of wire under predetermined tension successively around objects to form loops about the same, and mechanism for twisting the end portions of each loop about each other to tie the same, of means for supporting the object, the latter and said tying mechanism capable of relative movement toward each other whereby to compensate for the shortening of the end portions of the loop due to twisting the same about each other.

2. In a machine of the kind specified, the combination with means for passing one end portion of a long strand of wire under predetermined tension successively around objects to form loops about the same, and mechanism for twisting the end portions of each loop about each other to tie the same, of means for supporting the object, the latter and said tying mechanism including means for permitting yielding relative movement of said parts toward each other whereby to compensate for the shortening of the end portions of the loop due to twisting the same about each other.

3. Mechanism for tying objects with wire, including means for twisting the end portions of a loop of wire disposed about the object about each other to tie said loop, said means including means whereby said twisting begins at a predetermined point in the loop and continues outwardly therefrom whereby to prevent contraction of the loop during the twisting operation.

4. Mechanism for tying objects with wire, including mechanism for twisting the end portions of a loop of wire disposed about an object about each other to tie said loop, and means for supporting the object, said means including means permitting a movement of the object and said mechanism toward each other during the twisting operation to compensate for the shortening of the end portions of the loop due to said twisting thereof.

5. Mechanism for tying objects with wire, including means for imparting a predetermined tension to the loop about the object, mechanism for twisting the end portions of the loop about each other to tie the same, and means for supporting the object, said means including means permitting a movement of the object and said mechanism toward each other during the twisting operation to compensate for the shortening of the end portions of the loop due to said twisting thereof.

6. Mechanism for tying objects with wire, including means for imparting a predetermined tension to the loop about the object, mechanism for twisting the end portions of the loop about each other to tie the same, and means for supporting the object, said means and said twisting mechanism including means whereby said twisting begins at a predetermined point in the loop and continues outwardly therefrom whereby to prevent contraction of the loop during the twisting operation.

7. Mechanism for tying objects with wire, comprising in combination, means for forming a loop of wire about an object, means for supporting the object, said mechanism including means for imparting tension to said loop around said object, and means for twisting the end portions of said loop about each other to tie the latter, said twisting means including clamps for engaging the wire, and mechanism for rotating said clamps in a plane perpendicularly to the axis of said loop while engaged with said end portions of said wires, said object-supporting means permitting movement of the object toward said clamping means as the latter rotate.

8. In a machine for tying objects with wire, a carrier for the objects to be tied, a plurality of pairs of clamps each adapted to engage an object at two points at different elevations, and mechanism for bringing each of said pairs of clamps successively in position relative to the machine to enable the object carried thereby to be tied.

9. In a machine for tying objects with wire, the combination with the tying mechanism, of a carrier for objects to be tied including a member carrying a plurality of reciprocable plungers, object-engaging devices carried by each of said plungers, means for forcing objects into engagement with said devices and moving said plungers, mechanism whereby said devices are caused to embrace and engage said objects as said plungers are moved, means engaging said plungers to hold the same in the last-named position, means for effecting reverse movement of said plungers to effect release of the objects, and mechanism associated with the tying mechanism for effecting synchronous movement of the carrier therewith.

10. In a machine for tying objects with wire, the combination with the tying mechanism, of a carrier for objects to be tied including a member carrying a plurality of reciprocable plungers, object-engaging devices carried by each of said plungers, means for forcing objects into engagement with said devices and moving said plungers, mechanism whereby said devices are caused to embrace and engage said objects as said plungers are moved, means engaging said plungers to hold the same yieldingly in the last-named position, means for effecting reverse movement of said plungers to effect release of the objects, and mechanism associated with the tying mechanism for effecting synchronous movement of the carrier therewith.

11. In a machine of the kind specified, the combination with tying mechanism, of a carrier for objects to be tied comprising a turntable, means for effecting intermittent movement thereof in synchronism with the operation of the tying mechanism, a plurality of movable elements on said turntable, object-engaging devices carried by each, means for forcing objects into engaging relation thereto and moving the carrying element thereof, mechanism associated with said element for effecting an object-engaging movement of said object-engaging devices carried thereby, means associated with said element to retain the same in the last-named position, and means for effecting a reverse movement thereof to effect release of said object.

12. In a machine of the kind specified, the combination with tying mechanism, of a carrier for objects to be tied comprising a turntable, means for effecting intermittent movement thereof in synchronism with the operation of the tying mechanism, a plurality of movable elements on said turntable, object-engaging devices carried by each, means for forcing objects into engaging relation thereto and moving the carrying element thereof, mechanism associated with said element for effecting an object-engaging movement of said object-engaging devices carried thereby, means associated with said elements to retain the same yieldingly in the last-named position, and means for effecting a reverse movement thereof to effect release of said object.

13. In a carrier of the kind specified, a traveling member, a plurality of movable elements carried thereby, object-engaging means carried by said elements, mechanism for effecting opening and closing movement of said means as said elements are moved in respectively opposite directions, means for forcing objects into said means and effecting forced movement of said elements to close said means, means for retaining said elements in position to maintain said means closed about the objects, and means for effecting reverse movement of said elements to effect release of said objects.

14. In a carrier of the kind specified, a traveling member, a plurality of movable elements carried thereby, object-engaging means carried by said elements, mechanism for effecting opening and closing movement of said means as said elements are moved in respectively opposite directions, means for forcing objects into said means and effecting forced movement of said elements to close said means, means for retaining said elements yieldingly in position to maintain said means closed about the objects, and means for effecting reverse movement of said elements to effect release of said objects.

15. In a carrier of the kind specified, a traveling member, a plurality of movable elements carried thereby, object-engaging means carried by said elements, mechanism for effecting opening and closing movement of said means as said elements are moved in respectively opposite directions, means for forcing objects into said means and effecting forced movement of said elements to close said means, means for retaining said elements in position to maintain said means closed about the objects, said means permitting a slight reverse movement of said elements without effecting release of the object, and means for effecting reverse movement of said elements to effect release of said objects.

16. In a carrier of the kind specified, a traveling member, a plurality of movable elements carried thereby, object-engaging means carried by said elements, mechanism for effecting opening and closing movement of said means as said elements are moved in respectively opposite directions, means for forcing objects into said means and effecting forced movement of said elements to close said means, means for retaining said elements yieldingly in position to maintain said means closed about the objects, said means permitting a slight reverse movement of said elements without effecting release of the object, and means for effecting reverse movement of said elements to effect release of said objects.

17. In a carrier of the kind specified, a traveling member, a plurality of reciprocable plungers carried thereby, object-engaging mechanism mounted on each plunger, means for holding such plunger at the inner and outer limits of its movement respectively, means for forcing each plunger to the inner limit of its movement through the agency of the object, mechanism whereby the object-engaging mechanism is forced into engagement with the object as said plunger is so moved, and means for forcing the plunger to the outer limit of its movement to effect release of the object.

18. In a carrier of the kind specified, a traveling member, a plurality of reciprocable plungers carried thereby, object-engaging mechanism mounted on each plunger, means for yieldingly holding such plunger at the inner and outer limits of its movement respectively, means for forcing each plunger to the inner limit of its movement through the agency of the object, mechanism whereby the object-engaging mechanism is forced into engagement with the object as said plunger is so moved, and means for forcing the plunger to the outer limit of its movement to effect release of the object.

19. In a carrier of the kind specified, a traveling member, a plurality of reciprocable plungers carried thereby, object-engaging mechanism mounted on each plunger, means for holding such plunger at the inner and outer limits of its movement respectively, means for forcing each plunger to the inner limit of its movement through the agency of the object, mechanism whereby the object-engaging mechanism is forced into engagement with the object as said plunger is so moved, said means for holding said plunger at the inner limit of its movement permitting a slight movement of said plunger toward object-releasing position without effecting release of the object, and means for forcing the plunger to the outer limit of its movement to effect release of the object.

In testimony whereof we have signed our names in presence of two subscribing witnesses.

EDWIN V. NESSLING.
ROGERS M. WARWICK.

Witnesses:
M. M. BOYLE,
R. W. LOTZ.